（12）United States Patent
Colbeck et al.

(10) Patent No.: US 7,911,812 B2
(45) Date of Patent: Mar. 22, 2011

(54) CONTROL ARRANGEMENT FOR A PFC POWER CONVERTER

(75) Inventors: Roger Colbeck, Ottawa (CA); Mircea Cristian Boros, Richmond Hill (CA)

(73) Assignee: Power Integrations, Inc., San Jose, CA (US)

( * ) Notice: Subject to any disclaimer, the term of this patent is extended or adjusted under 35 U.S.C. 154(b) by 541 days.

(21) Appl. No.: 12/016,950

(22) Filed: Jan. 18, 2008

(65) Prior Publication Data
US 2008/0197817 A1 Aug. 21, 2008

Related U.S. Application Data

(60) Provisional application No. 60/881,480, filed on Jan. 22, 2007.

(51) Int. Cl.
*H02M 3/335* (2006.01)
(52) U.S. Cl. .................... 363/21.02; 363/21.1; 363/97
(58) Field of Classification Search .............. 363/16, 363/20, 21.01, 21.02, 21.03, 21.1, 21.11, 363/95, 97, 131
See application file for complete search history.

(56) References Cited

U.S. PATENT DOCUMENTS

| 5,500,792 | A | 3/1996 | Jeon et al. |
| 5,565,761 | A | 10/1996 | Hwang |
| 5,642,065 | A | 6/1997 | Choi et al. |
| 5,798,635 | A | 8/1998 | Hwang et al. |
| 6,215,288 | B1 | 4/2001 | Ramsey et al. |
| 6,249,876 | B1 | 6/2001 | Balakrishnan et al. |
| 6,272,025 | B1 | 8/2001 | Riggio et al. |
| 6,307,361 | B1 | 10/2001 | Yaakov et al. |
| 6,437,994 | B1 | 8/2002 | Blom et al. |
| 6,462,966 | B1 | 10/2002 | Leung et al. |
| 6,469,917 | B1 * | 10/2002 | Ben-Yaakov ............... 363/44 |
| 6,728,121 | B2 * | 4/2004 | Ben-Yaakov et al. ......... 363/89 |
| 6,903,536 | B2 | 6/2005 | Yang |
| 7,042,743 | B2 * | 5/2006 | Pidutti et al. ............... 363/89 |
| 7,184,280 | B2 | 2/2007 | Sun et al. |
| 7,440,297 | B2 * | 10/2008 | Adragna et al. .............. 363/50 |
| 2003/0223255 | A1 * | 12/2003 | Ben-Yaakov et al. ......... 363/89 |
| 2007/0063684 | A1 * | 3/2007 | Adragna et al. ............. 323/284 |
| 2007/0242487 | A1 | 10/2007 | Orr |
| 2008/0197817 | A1 | 8/2008 | Colbeck et al. |
| 2008/0198638 | A1 * | 8/2008 | Reinberger et al. ........... 363/74 |
| 2009/0091957 | A1 * | 4/2009 | Orr et al. .................... 363/79 |

OTHER PUBLICATIONS

Fairchild Semiconductor, "Application Note 42047; Power Factor Correction (PFC) Basics," Rev.0.9.0, Aug. 19, 2004, 11 pgs.
ON Semiconductor, "Overview of Power Factor Correction Approaches," Power Factor Correction Handbook, Chapter 1, HBD853/D, Rev. 2, Aug. 2004, pp. 5-17.

(Continued)

*Primary Examiner* — Adolf Berhane
(74) *Attorney, Agent, or Firm* — Blakely Sokoloff Taylor & Zafman, LLP

(57) ABSTRACT

In a PFC (Power Factor Correction) converter control unit, a PWM (pulse width modulated) signal is produced by comparing a PFC converter output voltage error signal, produced by a transconductance amplifier, with a ramp signal, which may be from a control unit of a resonant mode converter in cascade with the PFC converter. Level shifting is used to match the amplitude ranges of the compared signals. A current, representing an input current of the PFC converter and produced by a current mirror, is switched by the PWM signal to a parallel resistance and capacitance to produce a smoothed voltage constituting a control signal for the PFC converter.

18 Claims, 5 Drawing Sheets

OTHER PUBLICATIONS

Ben-Yaakov et al., "The Dynamics of a PWM Boost Converter with Resistive Input," IEEE Transactions on Industrial Electronics, vol. 46, No. 3, Jun. 1999, pp. 613-619.

Adragna, "AN1792 Application Note; Design of Fixed-Off-Time-Controlled PFC Pre-Regulators with the L6562," STMicroelectronics, Nov. 2003, pp. 1-30.

Yang, "LLC Resonant Converter," Chapter 4, *Topology Investigation for Front End DC/DC Power Conversion for Distributed Power System*, (dissertation submitted to the Faculty of Virginia Polytechnic Institute and State University, Sep. 12, 2003.

STMicroelectronics, "AN2321 Application Note; Reference Design: High Performance, L6599-based HB-LLC Adapter with PFC for Laptop Computers," Aug. 2006, pp. 1-29.

STMicroelectronics, "AN2393 Application Note; Reference Design: Wide Range 200W L6599-based HB-LLC Resonant Converter for LCD TV & Flat Panels," Sep. 2006, pp. 1-37.

STMicroelectronics, "L6563 L6563A; Advanced Transition-Mode PFC Controller," Nov. 2006, pp. 1-37.

STMicroelectronics, "L6599; High-Voltage Resonant Controller," Jul. 2006, pp. 1-36.

PCT/CA2008/000108—PCT International Search Report and Written Opinion, mailed Apr. 15, 2008.

PCT/CA2008/000109—PCT International Search Report and Written Opinion, mailed May 7, 2008.

PCT/CA2008/000111—PCT International Search Report and Written Opinion, mailed May 1, 2008.

Fairchild Semiconductor, "FAN4803: 8-Pin PFC and PWM Controller Combo," Rev. 1.2.3, Nov. 2, 2004, p. 1.

PCT/CA2008/000108—International Preliminary Report on Patentability and Written Opinion, dated Jul. 28, 2009.

PCT/CA2008/000109—International Preliminary Report on Patentability and Written Opinion, dated Jul. 28, 2009.

PCT/CA2008/000111—International Preliminary Report on Patentability and Written Opinion, dated Jul. 28, 2009.

\* cited by examiner

CONTROL ARRANGEMENT FOR A PFC POWER CONVERTER

This application claims the benefit of U.S. Provisional Application No. 60/881,480 filed Jan. 22, 2007, entitled "Cascaded Power Converters And Control Arrangement Therefor", the entire contents and disclosure of which are hereby incorporated herein by reference.

REFERENCE TO RELATED APPLICATIONS

Reference is directed to the following copending United States Patent Applications filed simultaneously herewith and claiming separate inventions, the entire contents and disclosure of each of which is hereby incorporated herein by reference;

"Cascaded PFC And Resonant Mode Power Converters", R. Orr et al., (PP048, 79115-64);

"Control Arrangement For A Resonant Mode Power Converter", Reinberger et al., (PP049, 79115-66).

This invention relates to a control arrangement for a PFC (Power Factor Correction) power converter.

BACKGROUND

It is known to provide a cascade of a boost converter for PFC followed by a PWM (pulse width modulation) buck converter for producing a lower voltage than the typically high output voltage of the PFC converter, and to operate these in a synchronized manner using a single clock reference. Such cascaded converters are described for example in Hwang U.S. Pat. No. 5,565,761, issued Oct. 15, 1996 and entitled "Synchronous Switching Cascade Connected Off-Line PFC-PWM Combination Power Converter Controller", and Hwang et al. U.S. Pat. No. 5,798,635, issued Aug. 25, 1998 and entitled "One Pin Error Amplifier And Switched Soft-Start For An Eight Pin PFC-PWM Combination integrated Circuit Converter Controller".

Another arrangement comprising cascaded PFC and PWM power converters is known from Fairchild Semiconductor Application Note 42047 entitled "Power Factor Correction (PFC) Basics", Rev. 0.9.0, Aug. 19, 2004. Various PFC arrangements and their control are known for example from Chapter 1, entitled "Overview of Power Factor Correction Approaches", of "Power Factor Correction (PFC) Handbook", ON Semiconductor document HBD853/D, Rev. 2, Aug. 2004.

In the Fairchild and ON Semiconductor documents referred to above, a PFC control unit is supplied with signals representing the input voltage, input current, and output voltage of the PFC converter and produces a PWM control signal using average current mode control to provide the PFC converter with a substantially resistive input.

In "The Dynamics of a PWM Boost Converter with Resistive Input" by S. Ben-Yaakov et al., IEEE Transactions on Industrial Electronics, Vol. 46, No. 3, June 1999, pp. 613-619 there is described an indirect PFC converter control scheme in which output voltage and input current, but not input voltage, of a boost converter operating in CCM are sensed to control the off-time duty cycle Doff of the converter to provide an equivalent resistive input, i.e. a power factor of 1. In this control scheme, operating in accordance with an equation Vin(av)=Doff.Vo(av) where Vin(av) is the average input voltage and Vo(av) is the average output voltage, an output voltage error is multiplied by average input current to produce a voltage that is modulated by a PWM modulator to produce Doff. This indirect control method has advantages such as being less susceptible to switching noise which is normally present on the input rectified line voltage, and not needing to monitor this voltage directly.

For relatively high converter powers, for example of about 200 W or more, it is desirable to operate the PFC converter in continuous current mode (CCM), in which a primary switch of the PFC converter is turned on before an inductor current has fallen to zero, to provide advantages such as relatively smaller inductor current swings and peak current. A PFC power converter operated in CCM usually has a fixed switching frequency. The PFC-PWM cascaded converters referred to above use an oscillator that determines the switching frequency for both converters.

Ta-yung Yang U.S. Pat. No. 6,903,536, issued Jun. 7, 2005 and entitled "PFC-PWM Controller Having Interleaved Switching", discloses another cascade of PFC and PWM converters, with interleaved switching and an oscillator determining the switching frequency of both converters. In this arrangement, the switching frequency is decreased under light-load and zero-load conditions, so that power consumption of the power converter is reduced under such conditions.

Typically, a lower power PFC converter is operated in critical conduction mode, also referred to as transition mode, in which the primary switch of the converter is turned on just at the time that the inductor current has fallen to zero. In this case the switching frequency is variable because it is determined by the operating conditions of the converter rather than by an oscillator. This is a discontinuous conduction mode (DCM) in which the inductor current fails to zero.

Another operating mode, referred to as fixed off-time (FOT) control and known from STMicroelectronics Application Note AN1792, "Design Of Fixed-Off-Time-Controlled PFC Pre-Regulators With The L6562", November 2003, uses a switching waveform with a fixed off-time and hence a variable frequency, without an oscillator. In this mode DCM and CCM operation occur alternately at different phases during a cycle of an input rectified AC line voltage. This mode requires the switching frequency to be very limited to keep distortion within acceptable limits, unless the off-time is made a function of the instantaneous line voltage, with more complexity and less predictable results.

It is desirable for the converter switching frequency to be relatively high, in order to reduce the sizes of reactive components. However, switching losses increase with increasing switching frequency, resulting in practical upper limits to the switching frequencies that can be used.

It is also known to reduce power converter switching losses by using a resonant mode power converter, taking advantage of zero voltage switching (ZVS) and/or zero current switching (ZCS). Examples of resonant mode converters include series resonant, parallel resonant, series parallel resonant or LCC, and LLC converters which are preferred. An LLC converter is operated with a variable frequency switching waveform, which is a substantially square waveform with dead times to avoid simultaneous conduction of the half bridge switches. A higher frequency corresponds to a lighter load, which is the converse of the PFC-PWM converter arrangement of Ta-yung Yang referred to above. Although a particular LLC converter may be designed for operation over a relatively narrow range of frequencies, different LLC converters for use in different applications, and with potentially different input voltages, may be required to operate in very different frequency ranges over a wide frequency band.

STMicroelectronics Application Notes AN2321, "Reference design: high performance, L6599-based HB-LLC adapter with PFC for laptop computers", August 2006 and AN2393, "Reference design: wide range 200 W L6599-based HB LLC resonant converter for LCD TV & flat panels", September 2006 disclose cascaded PFC and half bridge LLC power converters each using an L6563 controller for the PFC converter (in transition mode in AN2321, using FOT control in AN2393) and a separate L6599 resonant controller for the LLC converter. Reference is also directed in these respects to STMicroelectronics data sheets L6563, "Advanced transition-mode PFC controller", November 2006 and L6599, "High-voltage resonant controller", July 2006.

It is desirable to use an indirect control method as discussed above for the PFC control unit, to determine an off-time duty cycle for the PFC converter. As described in the document by Ben-Yaakov et al. referred to above, this control method typically involves multiplying an averaged converter input current by an output error voltage, and modulating the result to produce a PWM signal constituting an off-time duty cycle signal Doff. Such a control method presents a number of difficulties, especially for implementation in an IC operating at a typically low supply voltage.

In particular, with such control it is desirable to provide a relatively large gain for a voltage representing the sensed input current for a light converter load, but the gain is limited by the low supply voltage for sensed input current for heavier converter loads. Consequently, gain stages before and after a multiplier may typically be required. Providing a multiplier presents difficulties in terms of accuracy and the IC area that is required. In addition, it is convenient to represent the sensed converter input current with a negative voltage, which then needs to be handled by the multiplier. Lower amplitude signals have greater sensitivity to noise.

In addition, typically the PWM signal is produced by comparing the multiplier output signal with a ramp or sawtooth signal, which typically has a voltage from zero to a maximum ramp amplitude. In a CMOS IC, it may be difficult to provide an output swing of an amplifier to zero, so that the duty cycle range produced by comparing the output of a CMOS amplifier with a ramp signal may be restricted and/or non-linear.

A large dynamic range of an output voltage error amplifier of a PFC converter control unit is desirable because the PFC converter may typically be required to produce the same output voltage of about 380-400V from a rectified input AC voltage of about 85 to 265V rms, or about 120 to 375V peak. The square of the maximum to minimum ratio of this input voltage range is about 10, so that if the PFC converter is to handle this input voltage range and load conditions from full load to, for example, half load without unacceptable distortion, then the error amplifier must have a large output range of about 20:1.

SUMMARY OF THE INVENTION

According to one aspect this invention provides a method of controlling a PFC (Power Factor Correction) converter, comprising the steps of: producing a switching signal dependent upon an output voltage error of the converter; producing a current dependent upon an input current of the converter; selectively conducting the current via a resistance in dependence upon the switching signal; and smoothing a voltage across the resistance to produce a control signal for controlling an off-time duty cycle of the converter.

The step of smoothing, which constitutes a low pass filtering, serves not only to filter out the switching signal frequency but also to average the response of the control signal to the PFC converter input current, so that a separate low pass filter for averaging the signal dependent on the sensed converter input current is not required.

The step of producing the switching signal preferably comprises the steps of producing a first voltage dependent upon the output voltage error of the converter, and comparing said first voltage with a ramp signal to produce the switching signal as a pulse width modulated signal.

The step of comparing can comprise level-shifting the ramp signal to match an amplitude range of said first voltage, or level-shifting said first voltage to match an amplitude range of the ramp signal. The latter is preferred because the first voltage has a relatively slow rate of change.

The ramp signal can have a triangular or a sawtooth waveform. In the latter case the sawtooth waveform can correspond to a sawtooth signal for control of a resonant mode converter that can be cascaded with the PFC converter.

In one embodiment of the method, the step of comparing comprises level-shifting said first voltage to match an amplitude range of the sawtooth waveform, producing a second voltage equal to a maximum amplitude of the ramp signal minus the first voltage, and comparing said first and second voltages with the sawtooth signal to produce the switching signal.

Preferably the step of producing a current dependent upon an input current of the converter comprises mirroring the input current.

The step of selectively conducting the current via a resistance in dependence upon the switching signal can comprise controlling a switch, coupled in series with the resistance, with the switching signal.

Another aspect of this invention provides a control unit for a PFC (Power factor Correction) converter, comprising: a transconductance amplifier responsive to an output voltage of the converter for producing an output voltage error signal; a PWM converter for producing a PWM (pulse width modulated) signal dependent upon the output voltage error signal; a switching circuit for switching in dependence upon the PWM signal a current representing an input current of the PFC converter; and a resistance and a capacitance in parallel with the resistance responsive to the switched current to produce a smoothed voltage constituting a control signal for the PFC converter.

The PWM converter can comprise a comparator for comparing a first voltage dependent upon the output voltage error with a ramp signal to produce the PWM signal, and can include a level-shifter for matching amplitude ranges of the ramp signal and said first voltage. A sawtooth waveform can be supplied as the ramp signal, and the PWM converter can include a circuit for producing a second voltage, equal to a maximum amplitude of the ramp signal minus the first voltage, for comparison with the ramp signal.

Preferably the switching circuit comprises a current mirror circuit for producing a mirrored current dependent upon an input current of the PFC converter, and a switch controlled by the PWM signal for selectively supplying the mirrored current no the resistance.

The switching circuit can comprise first and second transistors constituting the current mirror circuit, the second transistor conducting said mirrored current, and an input resistance arranged to conduct current of the first transistor via an input terminal of the control unit, the input terminal having a voltage dependent upon the input current of the PFC converter. In this case a ratio of said resistance responsive to the switched current to said input resistance can be greater than a ratio of a supply voltage of the switching circuit to a maximum magnitude of voltage of said input terminal, because the switched current is chopped by the PWM signal. For example, the maximum magnitude of voltage of said input terminal can be of the order of 0.5 volt.

The invention also extends to the combination of a PFC converter and a control unit as recited above arranged to control a switch of the converter with said control signal.

BRIEF DESCRIPTION OF THE DRAWINGS

The invention and aspects thereof will be further understood from the following description by way of example with reference to the accompanying drawings, in which.

DETAILED DESCRIPTION

Figure 1:
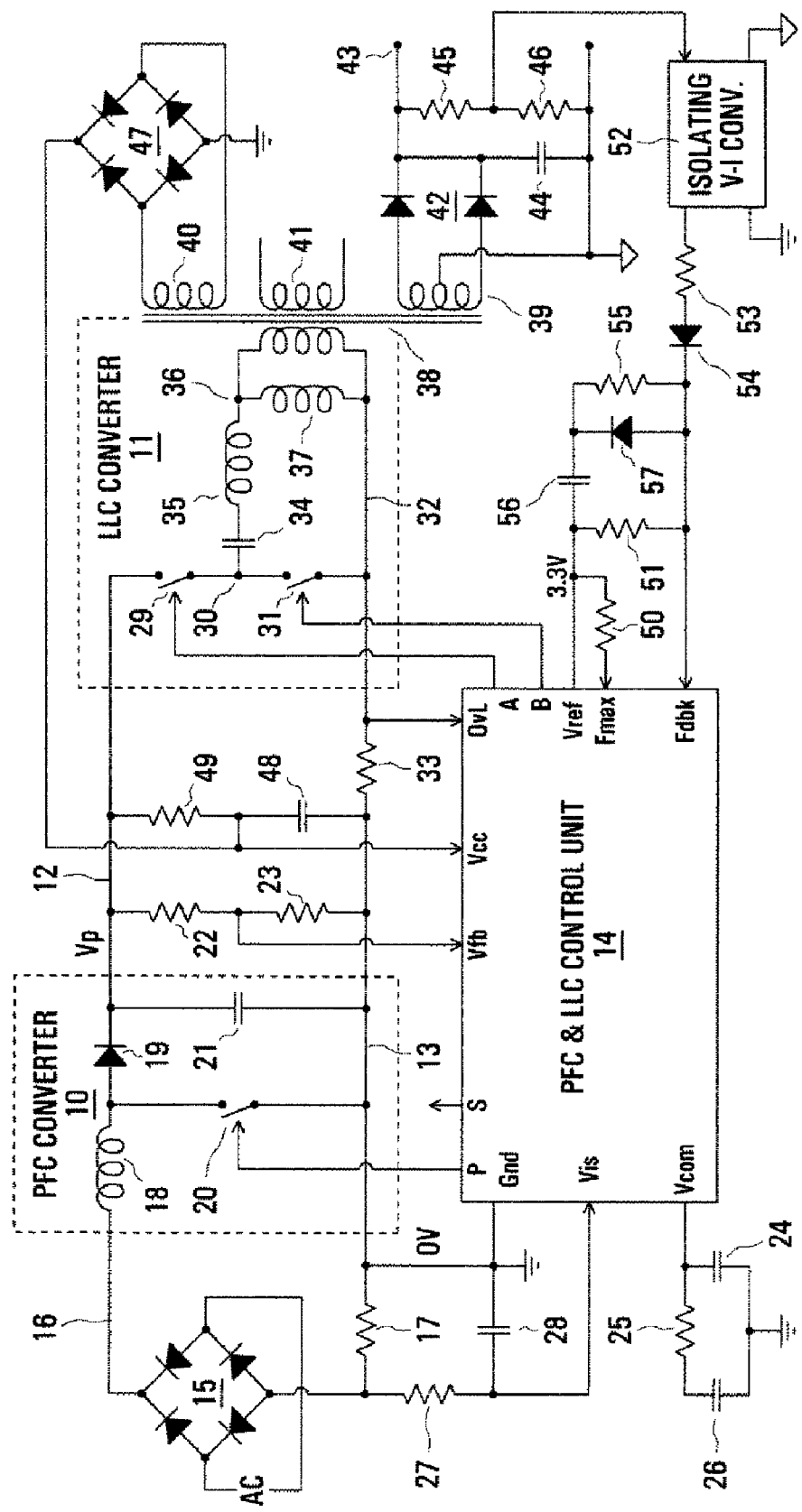
FIG. 1 schematically illustrates a power supply arrangement, including cascaded PFC and LLC power converters and a control arrangement for the converters, in accordance with an embodiment of the invention.

A power supply arrangement as illustrated in FIG. 1 includes a PFC power converter 10 and an LLC power converter 11, the converters being shown within broken line boxes. The converters 10 and 11 are cascaded, a positive output voltage Vp of the PFC converter 10, produced on a line 12 relative to a zero-volt (0V) line 13 connected to ground as shown, being connected as an input voltage for the LLC converter 11. The cascaded PFC and LLC power converters 10 and 11 are controlled as described further below by a PFC and LLC control unit 14, which has a ground connection Gnd connected to the line 13.

AC power supplied to an input of the power supply arrangement is rectified by a diode bridge 15. A positive rectified AC output of the diode bridge 15 is coupled via a line 16 to a positive voltage input of the PFC converter 10, and a return path is provided from the 0V line 13 to the diode bridge 15 via a current sensing resistor 17. By way of example, the line 16 may have a peak voltage in a range of about 125V to about 360V, depending on a voltage of the AC power, and one voltage Vp on the line 12 may be about 385V.

The PFC converter 10 shown in FIG. 1 comprises a conventional boost converter including an input inductor 18 and a diode 19 coupled in series between the line 16 and the line 12, a controlled switch 20, typically constituted by a MOSFET, coupled between a junction of the inductor 18 with the diode 19 and the 0V line 13, and an output capacitor 21 coupled between the lines 12 and 13. The switch 20 is controlled to be opened and closed by an output P of the control unit 14. Another output S of the control unit 14, not connected in FIG. 1, is provided for complementary control (with dead times) of a secondary switch (not shown) which may be provided in other forms of PFC converter.

A voltage divider comprising resistors 22 and 23 connected in series between the lines 12 and 13 supplies to a voltage feedback input Vfb of the control unit 14 a voltage proportional to the output voltage Vp of the PFC converter 10. Within the control unit 14, this voltage is supplied to a transconductance amplifier having an output coupled to a compensation point Vcom of the control unit 14, from which a capacitor 24, and a resistor 25 in series with a capacitor 26, are connected to ground or 0V. A negative voltage (relative to ground or 0V), produced at the junction of the current sensing resistor 17 with the diode bridge 15 and proportional to input current of the PFC converter 10, is coupled to another input Vis of the control unit 14 via a low pass filter constituted by a series resistor 27 and a shunt capacitor 23.

It is noted that the control unit 14 does not monitor the input voltage of the PFC converter 10, but only the input current and the output voltage Vp. The control unit 14 controls an off-time duty cycle Doff of the PFC converter switch 20 in accordance with:

$$\text{Doff} = Vi/Vp = Re*Is/Vp$$

where Vi is the input voltage on the line 16, Is is the input current sensed by the current sensing resistor 17, and Re is the equivalent load of the PFC converter reflected to its input, over a wide frequency range to provide a near-unity power factor for the power supply arrangement.

The LLC converter 11 has a half bridge topology comprising a primary switch 29 between the converter input voltage line 12 and a junction point 30, and a secondary switch 31 between the junction point 30 and a line 32 of the converter. The switches 29 and 31, which typically comprise MOSFETs, are controlled in a complementary manner, with dead times so that they are not simultaneously conductive, by outputs A and B respectively of the control unit 14. The line 32 is coupled to the 0V line 13 via a current sensing resistor 33 providing a return path of the LLC converter 11, and is connected to an input OvL of the control unit 14 to which it supplies a voltage proportional to input current of the LLC converter 11.

The junction point 30 is coupled to an output junction 36 of the LLC converter 11 via a capacitor 34 and a series inductor 35, the junction 36 being coupled via another inductor 37 to the line 32. The inductors 35 and 37, and the capacitor 34, constitute the LLC components of the converter 11. Outputs of the LLC converter 11 are taken from secondary windings of a transformer 38, which has a primary winding connected between the junction 36 and the line 32. In FIG. 1 the transformer 38 is represented as an "ideal" transformer, separate from the inductors 35 and 37. In practice, part or ail of one inductances of the inductors 35 and 37 can be constituted by leakage and magnetizing inductances of the transformer 38, so that functions of these inductors and the transformer are combined.

The transformer 38 can have any desired number of secondary windings; three secondary windings 39, 40, and 41 are shown by way of example in FIG. 1. The winding 39 has a centre tap, connected to a secondary side ground, and ends connected via full wave rectifier diodes 42 to an output 43. A smoothing capacitor 44 is connected between the output 43 and the secondary side ground, so that the output 43 provides a DC voltage output for equipment (not shown) powered by the power supply arrangement. A voltage divider, comprising resistors 45 and 46 connected in series between the output 43 and the secondary side ground, provides a voltage feedback for the LLC converter 11 as is further described below.

The secondary winding 40 is coupled to a diode bridge 47 whose negative output is connected to the primary side ground or 0V and whose positive output, smoothed by a capacitor 48 connected between this positive output and the 0V line 13, provides a supply voltage to an input Vcc of the control unit 14 for powering the control unit in a bootstrapped manner. To this end, a high impedance resistor 49 is also connected between the output line 12 of the PFC converter 10 and the input Vcc.

On connection of AC power to the power supply arrangement of FIG. 1, a small current flows via the inductor 18, diode 19, and resistor 49 to charge the capacitor 48, and the supply voltage at the input Vcc of the control unit 14 rises. On this reaching a start-up voltage of, for example, about 13V, this is detected by the control unit 14 which accordingly starts to drive the LLC converter 11, thereby to produce an output voltage via the secondary winding 40 and the diode bridge 47 to maintain charge of the capacitor 48 to a desired operating voltage of the control unit 14, for example about 12V. The initial operation of the control unit 14 reduces the charge of the capacitor 48, but not sufficiently to fall below a shut-down threshold voltage, of for example about 8.5V.

The secondary winding 41, to which no connections are shown in FIG. 1, is representative of any number of other secondary windings of the transformer 38 which may be used to provide other desired AC and/or DC outputs at high or low voltages, as may be desired. It can be appreciated that functions of the secondary windings can be combined, so that the transformer 38 can have one or more secondary windings.

The supply voltage at the input Vcc of the control unit 14 can be used by the control unit 14 to provide a sufficiently high voltage to drive the switches 20, 29, and 31 of the converters 10 and 11. In addition, the control unit 14 uses this supply voltage to produce at an output Vref a regulated supply voltage; this supply voltage is also used within the control unit 14 for powering most of its circuits. In addition, using the unregulated and/or regulated supply voltages the control unit 14 powers a bandgap voltage reference (not shown) and derives various threshold voltages for use in operation of the control unit. By way of example, the regulated supply voltage is assumed to be 3.3V as shown in FIG. 1, and other voltages and voltage ranges referred to below are given in the context of this supply voltage.

A resistor 50 is connected between the output Vref of the control unit 14 and an input Fmax of the control unit, to which it supplies a current which determines a desired maximum switching frequency of the LLC converter 11. Another resistor 51 is connected between the output Vref of the control unit 14 and an input Fdbk of the control unit, to which it supplies a current which determines a desired minimum switching frequency of the LLC converter 11. An electrically isolating voltage-to-current (V-I) converter 52 produces at its output an error current which is supplied via a series resistor 53 and a diode 54 to the input Fdbk of the control unit 14 for feedback control of the frequency of the LLC converter 11 within the range determined by the resistors 50 and 51. This feedback error current is proportional to a difference between the voltage at the junction between the resistors 45 and 46, supplied to the converter 52 and representing the voltage at the DC output 43, and a reference voltage (not shown), and can be produced in a frequency compensated manner for example along the lines shown in FIG. 1 of Application Note AN2321 referred to above.

An additional circuit, comprising a resistor 55 in series with a capacitor 56 between the input Fdbk and the output Vref of the control unit 14, and optionally with a diode 57 in parallel with the resistor 55 as shown in FIG. 1, provides for a soft start of the LLC converter 11 under no-load or light load conditions, whereby the switching frequency is reduced gradually from its maximum to a normal operating value.

Figure 2:
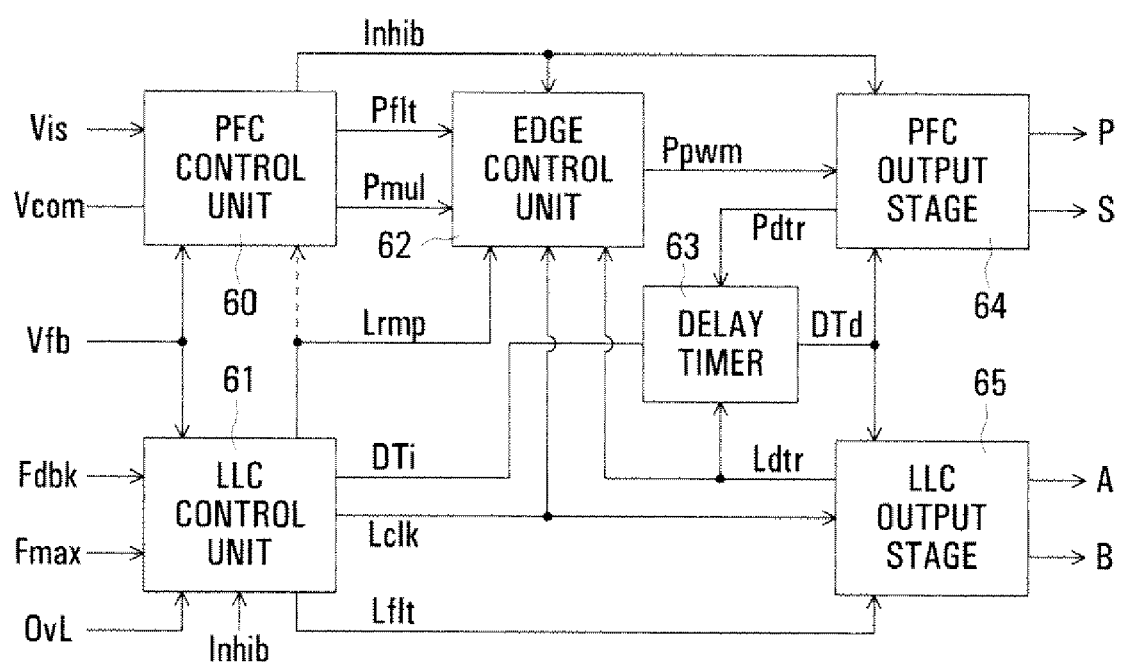
FIG. 2 illustrates in a block diagram parts of one form of a PFC and LLC control unit of the control arrangement of FIG. 1.

FIG. 2 shows a block diagram of parts of one form of the PFC and LLC control unit 14 of the power supply control arrangement of FIG. 1. These parts comprise a PFC control unit 60, an LLC control unit 61, an edge control unit 62, a delay timer 63, a PFC output stage 64, and an LLC output stage 65. For simplicity other parts of the control unit 14, such as for voltage regulation, producing desired threshold voltages, programming desired settings, and test purposes, are not shown.

Except for the connections Gnd, Vcc, and Vref which are not shown in FIG. 2, FIG. 2 shows the same external connections of the control unit 14, using the same references, as FIG. 1. These references are also used to refer to signals at the respective connections. FIG. 2 also shows various signals that are produced within and exchanged among various parts of the control unit in operation, as described further below. Functions of the blocks shown in FIG. 2 and the related signals briefly described as follows.

The PFC control unit 60 is supplied with the PFC current sensing voltage Vis and the PFC feedback voltage Vfb, and also has a connection to the compensation point Vcom to which the components 24 to 26 are connected as described above. These components are selected for a voltage at the point Vcom of typically 0.5 to 2.5V with a PFC control loop bandwidth of the order of about 10 to 20 Hz. The PFC control unit 60 compares the feedback values Vis and Vfb with over-current and over-voltage threshold values respectively, and in response to an over-current or over-voltage condition of the PFC converter 10 determined by these comparisons it produces a PFC fault signal Pflt which is supplied to the edge control unit 62. The PFC control unit 60 also compares the feedback voltage Vfb with an inhibit threshold voltage, and in response to an under-voltage condition (e.g. in the event of AC brown-out or failure) determined by this comparison produces an inhibit signal Inhib which is supplied to the LLC control unit 61, the edge control unit 62, and the PFC output stage 64.

In normal operating conditions, the PFC control unit 60 processes the feedback signals Vis and Vfb to produce a signal Pmul, which is supplied to the edge control unit 62, which is directly proportional to the off-time duty cycle Doff required for the PFC converter 10 at any instant to provide the desired power factor correction in accordance with the above equation for Doff. Thus throughout each rectified AC cycle of the PFC input voltage on the line 16 in FIG. 1, the off-time duty cycle Doff, as represented by the signal Pmul, is varied by the PFC control unit 60 to present an equivalent substantially resistive load to the AC supply. By way of example, the signal Pmul can have a value from 0 to 2.0V for representing off-time duty cycles from 0 to 100%.

The PFC control unit 60 can optionally use a ramp signal Lrmp, which is produced by the LLC control unit 61 as described below, which can be supplied to the PFC control unit 60 as shown by a dashed line in FIG. 2.

The LLC control unit 61 is supplied with the signal Fdbk, which as described above is a current representing an error voltage of the LLC converter, and uses this to produce a controlled frequency square waveform clock signal Lclk which is supplied to the LLC output stage 65, and also to the edge control unit 62. The LLC control unit 61 also produces a sawtooth or ramp signal Lrmp which is supplied to the edge control unit 62 and, optionally as described above, to the PFC control unit 60. For example the ramp signal Lrmp has an amplitude from 0 to 2.0V and a frequency which is twice the frequency of the clock signal Lclk. As indicated above, a minimum frequency of the LLC clock signal Lclk is set by a minimum current supplied to the input Fdbk via the resistor 51, and a maximum frequency of the LLC clock signal Lclk is set by the resistor 50 supplying a current via the input Fmax to a current mirror arrangement in the LLC control unit 61. For example the maximum frequency may be set to a value about 2 or 3 times a normal LLC operating frequency for a particular application, with the minimum frequency being lower than this normal operating frequency. The normal operating frequency typically is in a narrow frequency range, but may be selected from a wide frequency band, for example of the order of about 50 kHz to about 1 MHz, for any particular application of the LLC converter.

The LLC control unit 61 also produces a signal DTi for the delay timer 63, this signal being a current that is produced by the current mirror arrangement in the LLC control unit 61 in dependence upon the current supplied to its input Fmax. The delay timer 63 determines a dead time in dependence upon the current signal DTi, so that the dead time is adjusted for the wide range of possible LLC frequencies.

In addition, the LLC control unit 61 is supplied with the inhibit signal Inhib to inhibit generation of the signals Lrmp and Lclk when the signal Inhib is asserted. The LLC control unit 61 is further supplied via the input OvL with the voltage dropped across the resistor 33 and representing input current of the LLC converter 11, and compares this with at least one threshold to determine a possible overload condition of the LLC converter, In response to which it produces an LLC fault signal Lflt which is supplied to the LLC output stage 65. The LLC control unit 61 is also supplied with the PFC feedback voltage signal Vfb, which it compares with a threshold to enable start-up of the LLC converter only when the PFC converter output voltage Vp is above a selected level, for example 360V. A soft start function in the LLC control unit 61 operates in conjunction with the components 55 to 57 in FIG. 1 as indicated above to provide a soft start when the LLC converter is enabled and after any overload fault.

The edge control unit 62 compares the duty cycle signal Pmul with the LLC ramp signal Lrmp to produce a PFC PWM signal Ppwm with the desired duty cycle, this signal being supplied to the PFC output stage 64. The signal Ppwm is harmonically related to the LLC clock signal Lclk, which is also supplied to the edge control unit 62, conveniently in a 1:1 or same-frequency relationship. The edge control unit 62 produces the signal Ppwm with edges or transitions that are timed to avoid coinciding with edges of the signal Lclk, for minimum interference, and with a phase for maximum efficiency of the power supply arrangement. To this end the edge control unit 62 is also supplied with a signal Ldtr produced by the LLC output stage 65 as described below, and which is high during dead times of the LLC output stage. The edge control unit 62 is further supplied with the signals Pflt and Inhib, in response to either of which it inhibits the signal Ppwm.

The delay timer 63 is responsive to a PFC delay time request signal Pdtr supplied to it from the PFC output stage 64, or an LLC delay time request signal Ldtr supplied to it from the LLC output stage 65, to produce a delay time done signal DTd, which is supplied to each of these output stages 64 and 65, after a delay time that is determined as indicated above by the signal DTi, whereby the delay time is adjusted to suit the normal operating frequency of the LLC converter 11 (and the switching frequency of the PFC converter 10 which is here assumed to be the same).

The PFC output stage 64 comprise a level shifter and gate driver for producing the output P for driving the primary switch 20 of the PFC converter 10 in accordance with the signal Ppwm and unless it is inhibited by the signal Inhib, with a similar arrangement for driving the output S in a complementary manner, with dead times, to avoid undesired simultaneous conduction of PFC converter switches, provided by the delay timer 63 as described above. The PFC output stage 64 can include more complex arrangements for producing various relative timings of its output signals P and S to suit different switching arrangements that may be required for different types of PFC converter.

The LLC output stage 65 also comprises level shifters and gate drivers for producing its output signals A and B for driving the switches 29 and 31 respectively of the LLC converter 11, unless these are inhibited by the signal Lflt, at the frequency of the signal Lclk and with dead times, to avoid simultaneous conduction of the switches 29 and 31, provided by the delay timer 63 as described above.

Particular forms of the PFC control unit 60 are described in greater detail and by way of example below. Particular forms of other parts of the PFC and LLC control unit 14 are described in greater detail and by way of example in the related applications referred to above.

Figure 3:
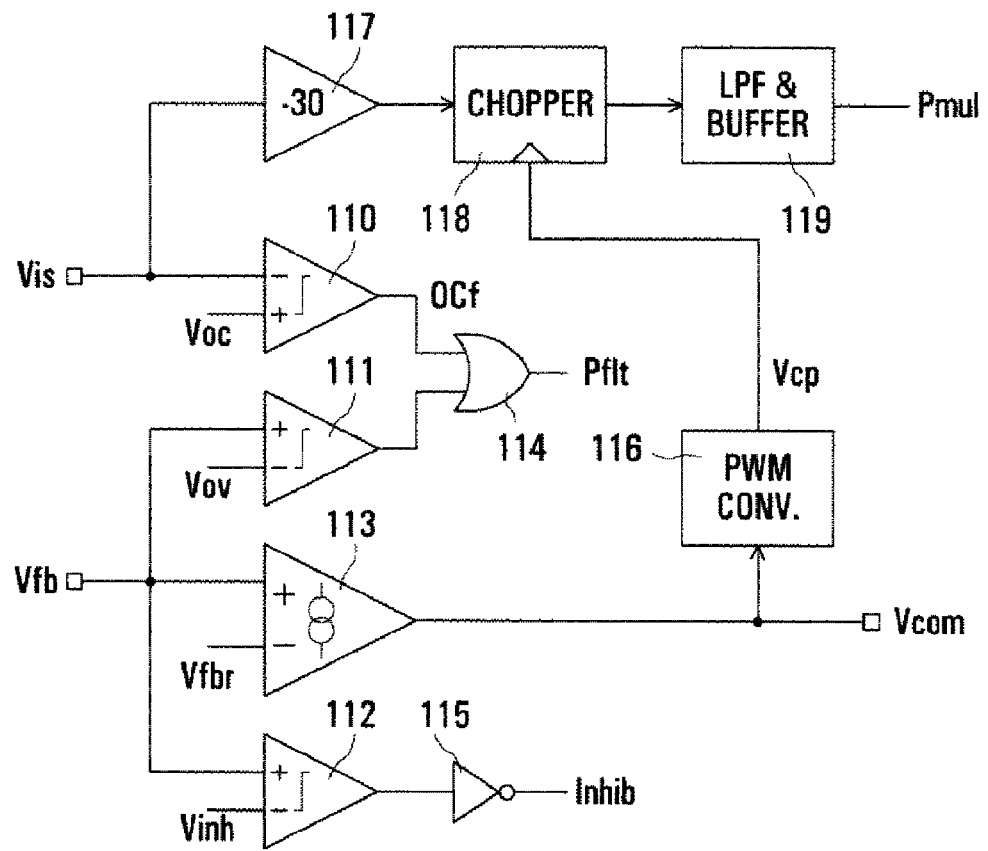
FIG. 3 shows a block diagram of a PFC control unit of the PFC and LLC control unit of FIG. 2 in accordance with an embodiment of the invention.

FIG. 3 shows by way of example a block diagram of a particular form of the PFC control unit 60, with the inputs Vfb and Vis and the point Vcom to which connections are made as shown in FIG. 1. The PFC control unit as shown in FIG. 3 comprises comparators 110 to 112, a transconductance amplifier 113, an OR gate 114, an inverter 115, a PWM converter 116, an amplifier 117, a chopper 118, and a low pass filter (LPF) and buffer 119.

The feedback voltage at the input Vfb is supplied to a non-inverting input of each of the comparators 111 and 112, whose inverting inputs are supplied with respective threshold voltages Vov and Vinh, and to a non-inverting input of the transconductance amplifier 113, whose inverting input is supplied with a feedback reference voltage Vfbr and whose output is connected to the compensation point Vcom, to which the compensation components 24 to 26 are connected as described above. For example, for a supply voltage of at least 3V and assumed here to be 3.3V, the voltage Vfbr may be about 2.2V, and the resistances of the resistors 22 and 23 (FIG. 1) are selected so that the input Vfb is equal to this (2.2V) when the PFC output voltage Vp has a desired value, for example 385V as described above.

In the event that the feedback voltage Vfb falls below the threshold Vinh, constituting an inhibit threshold of for example 0.5 to 0.6V, the comparator 112 changes state to produce a high level of the signal Inhib at the output of the inverter 115. In the event that the feedback voltage exceeds the threshold voltage Vov of for example 2.3 or 2.4V, the comparator 111 changes state to indicate an overvoltage by providing a high level at its output, thereby producing a high level of the signal Pflt via the OR gate 114. It is observed that these and other threshold voltages can be provided with hysteresis to facilitate providing stable comparator outputs. It is also observed that the threshold voltages can be derived from a resistor chain which is calibrated for the feedback reference voltage Vfbr, so that all of the threshold voltages are correlated. Calibration can be performed by monitoring the point Vcom, so that it takes into account any offset of the transconductance amplifier 113.

As described above, the components 24 to 26 are selected for a voltage at the point Vcom of typically 0.5 to 2.5V, with a PFC control loop bandwidth of the order of about 10 to 20 Hz, for a normal range of the feedback voltage Vfb. The output of the transconductance amplifier 113 at the point Vcom is supplied to the PWM converter 116, which produces at its output a signal Vcp which is a PWM signal dependent upon the voltage at the point Vcom. Various alternative forms of the PWM converter 116 are described below with reference to FIGS. 7 to 9.

The input Vis, which has a small negative voltage dependent upon the sensed input current of the PFC converter 10, low pass filtered by the components 27 and 28 to reduce noise as described above, is connected to an inverting input of the comparator 110, a non-inverting input of which is supplied with an over-current threshold voltage Voc so that in the event of an over-current condition a signal OCf produced at the output of the comparator 110 becomes high to indicate an over-current fault, producing a high level of the signal Pflt via the OR gate 114.

The input voltage Vis is also supplied to the input of the amplifier 117, which for example has a gain of −30 as indicated in FIG. 3. An output of the amplifier 117 is switched or chopped with the signal Vcp by the chopper 118, and the output of the chopper 118 is filtered and buffered by the low pass filter and buffer 119 to produce the signal Pmul at its output.

Figure 4:
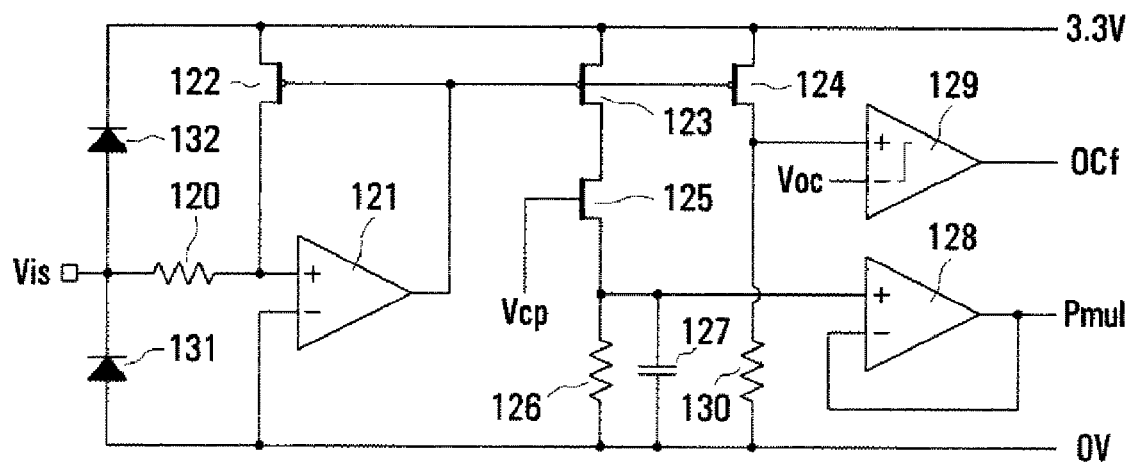
FIG. 4 illustrates some parts of the PFC control unit of FIG. 3 in greater detail.

A convenient form of the parts 110 and 117 to 119 of the PFC control unit of FIG. 3 is schematically illustrated in FIG. 4, in which the input Vis is connected via a resistor 120 to an inverting input of a differential amplifier 121, which has its inverting input connected to a 0V line and its output connected to the gates of P-channel transistors 122 to 124 whose sources are connected to the 3.3V supply voltage line. The transistor 122 has its drain connected to the non-inverting input of the amplifier 121. The transistor 123 has its drain coupled via the drain-source path of an N-channel transistor 125 to a junction of a resistor 126 and a capacitor 127 connected in parallel to the 0V line. This junction is also connected to a unity-gain buffer amplifier 128 whose output provides the signal Pmul. The gate of the transistor 125 is supplied with the signal Vcp. The drain of the transistor 124 is connected to a non-inverting input of a comparator 129, whose inverting input is supplied with the over-current threshold voltage Voc and whose output provides the signal OCf, and via a resistor 130 to the 0V line. FIG. 4 also shows conventional protection diodes 131 and 132 connected between the input Vis and the 0V and 3.3V voltage lines.

The components 120 to 123 and 126 constitute the amplifier 117 of FIG. 3, the transistor 125 constitutes the chopper 118 of FIG. 3, the capacitor 127 and amplifier 128 add the functions of the LPF and buffer 119 of FIG. 3, and the components 124, 129, and 130 add the function of the comparator 110 of FIG. 3. For example, the resistor 120 can have a resistance of 100 kΩ, and the resistor 126 can have a resistance of 3 MΩ, so that their ratio of 30 gives the magnitude of the gain of the amplifier 117 as described above.

In operation of the control arrangement, a negative voltage between 0V and about −0.5V, proportional to the input current of the PFC converter 10, is supplied to the input Vis. The amplifier 121 maintains a virtual ground at its non-inverting input, so that the resistor 120 conducts a current out of the input Vis, equal to the magnitude of the input voltage Vis divided by the resistance of the resistor 120. This current is supplied via the transistor 122, and a corresponding mirrored current is passed by the transistor 123 when the transistor 125 is turned on by the PWM signal Vcp. Consequently a positive voltage, which is 30 times the negative input voltage Vis multiplied by the on-time duty cycle of the PWM signal Vcp, is dropped across the resistor 126. This voltage is smoothed by the capacitor 127, forming the LPF with a pole at a frequency for example in a range from about 1 kHz to about 10 kHz, and the smoothed voltage is buffered by the buffer amplifier 128 and reproduced at its output as the signal voltage Pmul. The low pass filter not only filters out the chopper frequency, but also serves in effect to average the sensed input current signal at the input Vis.

The transistor 124 and the resistor 130 also pass a mirrored current to produce a voltage drop across the resistor which the comparator 129 compares with the threshold voltage Voc to produce the over-current signal OCf. Hysteresis can be provided for the comparator 129 by using its output to select different resistance values for the resistor 130.

It is evident that the voltage dropped across the resistor 126 is limited to being less than the supply voltage, e.g. 3.3V. Without the chopper function provided by the PWM signal Vcp and the transistor 125, the gain of −30 provided by the circuit of FIG. 4 (the amplifier 117 of FIG. 3) could only be attained for input voltages Vis from 0V to about −0.1V. For a desirably larger input voltage range, such as a range from 0 to about −0.5V, without the chopping function the gain of the amplifier 117 would have to be restricted to be less than about 6 (about 3V divided by about 0.5V). These undesirable constraints are avoided by the circuit of FIG. 4, because the dynamic range of the voltage produced across the resistor 126 is limited by the chopping function of the transistor 125. A relatively large magnitude of the input voltage Vis coincides with a relatively small on-time duty cycle of the PWM signal Vcp, and a large on-time duty cycle of the PWM signal coincides with a small input voltage Vis, so that in either case in normal operation, the voltage produced across the resistor 126 is less than the supply voltage, because the gain of the amplifier 117 is multiplied by the on-time duty cycle of the chopper in producing this voltage.

The diodes 131 and 132 serve in known manner for protection against external voltages, beyond the supply voltages, at the input Vis, for example due to electrostatic discharge. An external resistor, having a relatively low resistance, can be connected in series with the input Vis to limit current through the protection diode 131 or 132 due to such an external voltage. However, in normal operation as the input voltage Vis becomes more negative, the diode 131 begins to become forward biased, producing an input leakage current which can decrease the accuracy of the current sensing.

Figure 5:
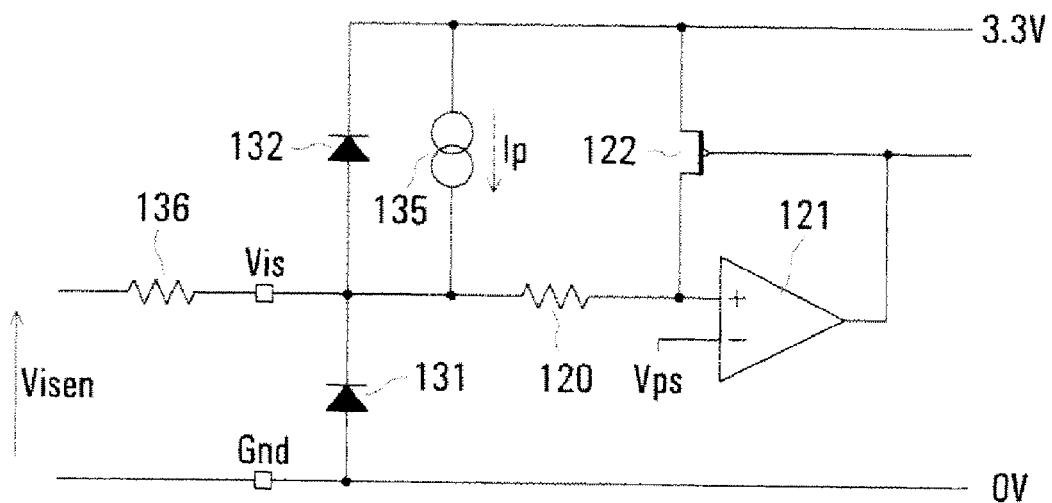
FIGS. 5 and 6 schematically illustrate alternative forms of part of the PFC control unit of FIG. 3.
Figure 6:
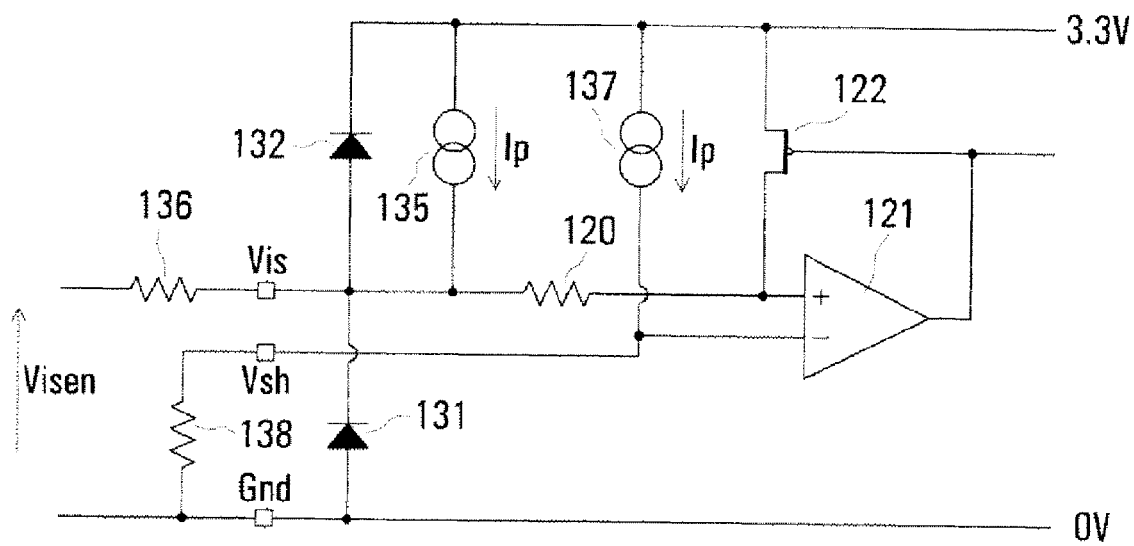

This can be reduced or avoided by shifting the voltage at the input Vis and at the inputs of the amplifier 121 in a positive direction by a small amount, for example up to about 0.6V, so that the diode 131 is not forward biased for any normal converter current sensing conditions. FIGS. 5 and 6 schematically illustrate alternative forms of part of the PFC control unit providing such voltage shifting.

Referring to FIG. 5, this shows the components 120 to 122 and the protection diodes 131 and 132, connected in the same manner as in the circuit of FIG. 3 except that the inverting input of the amplifier 121 is supplied with a fixed voltage Vps. In addition, a constant current source 135, supplying a current Ip, is connected between the 3.3V supply voltage rail and the input Vis, and the negative voltage representing the sensed PFC converter input current, shown in FIG. 5 as a voltage Visen with respect to the ground or 0V connection Gnd, is supplied to the input Vis via a series resistor 136. For example, the constant current Ip can be produced by a current mirror (not shown) in the same manner as a current Limi (not shown) described in the related application entitled "Control Arrangement For A Resonant Mode Power Converter" and incorporated herein by reference, so that the current Ip is determined by the external resistor 50 which determines a maximum current Ifmax corresponding to a maximum frequency of the LLC converter 11. For any particular relationship among the parameters Vps, Ip, and Ifmax, the resistance of the resistor 136 can be a constant multiple of the resistance of the resistor 50.

For example, the voltage Vps can be 0.5V, the current Ip can be 5 μA, the resistor 120 can have a resistance of 100 kΩ, and the resistor 136 can have a resistance of 50 kΩ. In this case the current Ip flowing through the resistor 136 drops a voltage of 0.5V equal to the voltage Vps, and for voltages Visen from 0V to −0.5V the current supplied via the transistor 122 is from 1.67 μA to 5 μA. Without the constant current source 135 and the resistor 136, the current supplied via the transistor 122 would range from 0 to 5 μA; this difference is compensated by an increase of the voltage Vcom at the output of the amplifier 113 by a factor 1+(R136/R120), where R136 is the resistance of the resistor 136 and R120 is the resistance of the resistor 120.

FIG. 6 shows a similar arrangement to that of FIG. 5, except that it provides the voltage Vps at the inverting input of the amplifier 120 by passing another constant current Ip, produced by a constant current source 137 which can comprise a further current mirror transistor, through an additional resistor 138 to ground. As shown in FIG. 6, the resistor 138 can be external to an IC implementing the control unit, which accordingly in this case has a further connection point Vsh. This facilitates matching the voltage shifts at the inputs of the amplifier 121, because the currents Ip produced by the constant current sources 135 and 137 can be closely matched.

As described above, the normal range of the voltage Vcom is from 0.5 to 2.5V. The PWM converter 116 is arranged to convert the voltage Vcom to the PWM signal Vcp with an offset so that a minimum Vcom voltage of 0.5V corresponds to 0% duty cycle, and a maximum Vcom voltage of 2.5V corresponds to 100% duty cycle, of the signal Vcp. This provides a significant advantage in avoiding low voltage swings of the output of the error voltage amplifier, constituted by the transconductance amplifier 113, which can be difficult for an IC amplifier to provide, especially in a linear manner as is desired.

Figure 7:
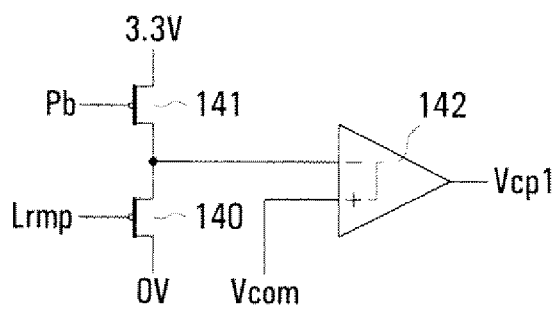
FIGS. 7, 8, and 9 schematically illustrate alternative forms of a PWM converter of the PFC control unit of FIG. 3.
Figure 8:
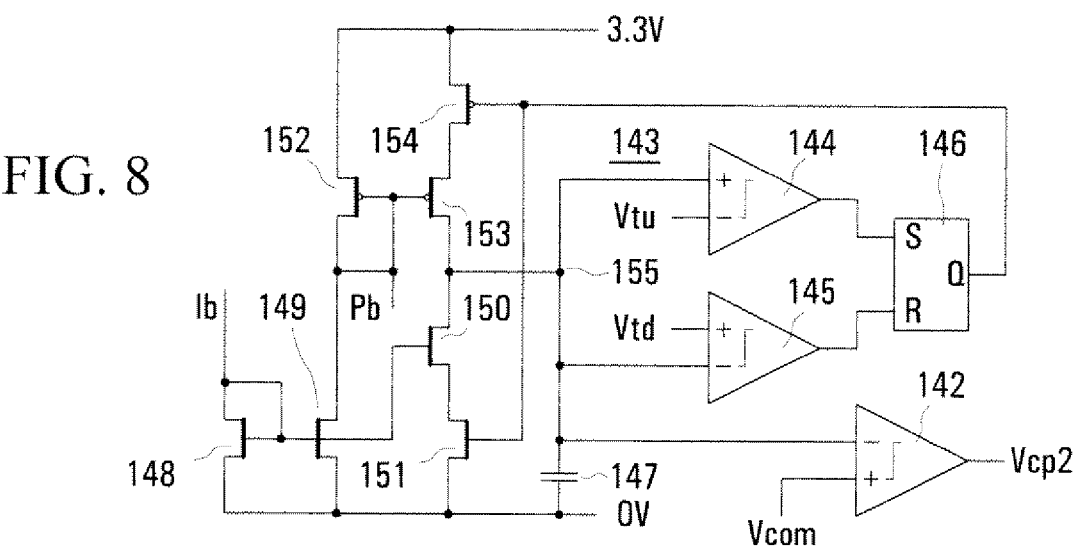
Figure 9:
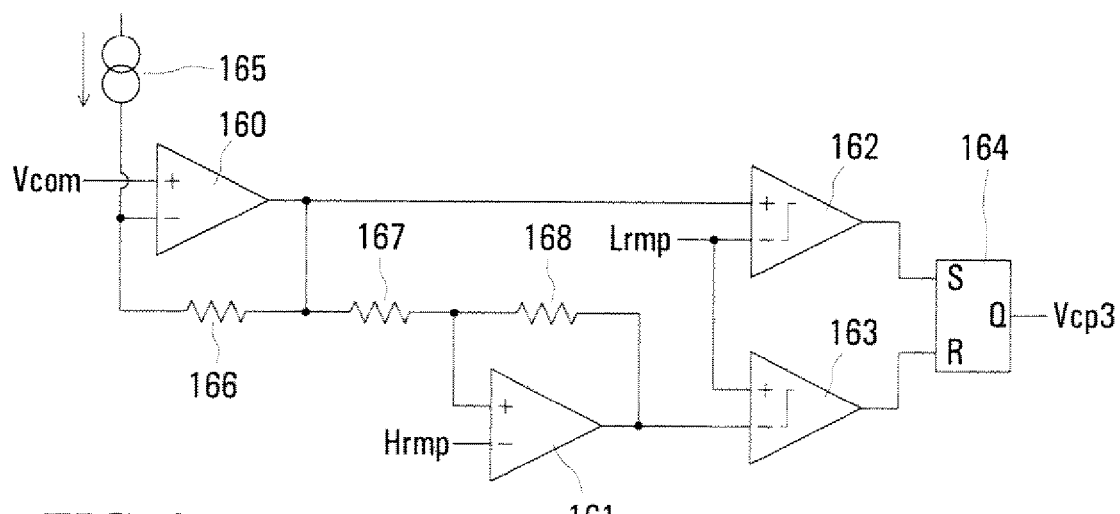

To this end, the PWM converter 116 compares the voltage Vcom with a ramp signal, having a range of about 0.5 to about 2.5V, to produce the PWM signal Vcp. FIGS. 7 to 9 illustrate alternative forms of the PFC converter 116, any of which can be used in particular circumstances. Conveniently, more than one of these forms of the PWM converter 116 can be provided in an IC and one of them can be selected by programming of the IC.

The form of the PWM converter 116 shown in FIG. 7 comprises P-channel transistors 140 and 141 and a comparator 142 producing an output signal Vcp1 which can constitute the PWM signal Vcp. The transistor 140 has its gate supplied with the LLC ramp signal Lrmp from the LLC control unit 61 as described above, its drain connected to the 0V line, and its source connected to the drain of the transistor 141, whose source is connected to the 3.3V supply voltage line and whose gate is connected to a bias voltage Pb, which may be produced as described, below with reference to FIG. 8. The source of the transistor 140 is also connected to the inverting input of the comparator 142, whose non-inverting input is supplied with the voltage Vcom.

The LLC ramp signal Lrmp, which has a voltage from 0V to 2.0V as described above, is shifted in a positive direction by the gate-source threshold voltage of the transistor 140, which is typically from 0.4 to 0.9V. Consequently, the ramp voltage supplied to the inverting input of the comparator in this case is approximately equal to the optimum range of 0.5 to 2.5V for the voltage Vcom as described above. The frequency of the PWM signal Vcp1, which is relatively arbitrary because it is filtered out by the LPF 119 described above, is in this case equal to the frequency of the LLC ramp signal Lrmp, which may be desirable for avoiding any risk of beat frequencies arising as the LLC frequency varies.

The form of the PWM converter 116 shown in FIG. 8 comprises a free-running triangular waveform oscillator 143 and a comparator which can be the same as the comparator 142 of FIG. 7 and accordingly has the same reference. The oscillator 143 comprises comparators 144 and 145, a flip-flop 146, a capacitor 147, M-channel transistors 148 to 151, and P-channel transistors 152 to 154.

As shown in FIG. 8, a bias current Ib is supplied to a current mirror formed by the transistors 148 to 150, and the corresponding current of the transistor 149 is supplied to a current mirror formed by the transistors 152 and 153, so that the transistors 150 and 153 can pass the same current when enabled by outer switches formed by the transistors 151 and 154, whose gates are connected together and to the output Q of the flip-flop 146. The bias voltage Pb referred to above can be derived from the interconnected gates of the transistors 152 and 153.

The interconnected drains of the transistors 150 and 153 are connected to a junction 155, which is connected to the non-inverting input of the comparator 144, to the inverting input of the comparator 145, via the capacitor 147 to the 0V line, and to the inverting input of the comparator 142 as a triangular waveform for comparison with the voltage Vcom. The comparator 144 has an upper threshold voltage Vtu supplied to its inverting input, and its output connected to a set input S of the flip-flop 146, and the comparator 145 has a lower threshold voltage Vtd supplied to its non-inverting input, and its output connected to a reset input R of the flip-flop 146. The threshold voltages Vtd and Vtu are selected to define the desired range of 0.5V to 2.5V for the triangular waveform at the junction 145. To allow for the speed of the circuit components, the threshold voltage Vtd may be a little more than 0.5V, for example about 0.6V, and the threshold voltage Vtu may be a little less than 2.5V, for example 2.4V.

In operation, when the output Q of the flip-flop 146 is low, the transistor 151 is off and the transistor 154 is on to allow current through the transistor 153 to charge the capacitor 147, until the voltage at the junction 155 crosses the upper threshold voltage Vtu, setting the flip flop 146 so that its output Q goes high. Then the transistor 154 is turned off and the transistor 151 is turned on to allow current through the transistor 150 to discharge the capacitor 147, until the voltage at the junction 155 crosses the lower threshold voltage Vtd, whereupon the comparator 145 resets the flip-flop 146 and the cycle repeats.

Ideally, the triangular waveform produced at the junction 155 varies relatively accurately between 0.5 and 2.5V as is desired, in a linear manner due to equal constant current charging and discharging of the capacitor 147 in accordance with the bias current Ib, and the PWM signal Vcp2 produced in this case is unrelated to other operating frequencies of the control arrangement.

In practice, shifting the LLC ramp signal Lrmp up for comparison with the voltage Vcom as in the PWM converter of FIG. 1, with the amount of the shift depending upon the gate threshold voltage of the transistor 140, and generating a sufficiently accurate triangular waveform as in FIG. 8, with the possibility of beat frequencies between this triangular waveform and the LLC ramp signal Lrmp, may not produce sufficiently desirable and reliable results.

Instead, the voltage Vcom can be shifted down, for example as in the form of the PWM converter shown in FIG. 9, which comprises differential amplifiers 160 and 161, comparators 162 and 163, a flip-flop 164, a constant current source 165, and resistors 166 to 168.

Referring to FIG. 9, the amplifier 160 has the voltage Vcom supplied to its non-inverting input, and its output coupled via the resistor 166 to the inverting input of the amplifier. The source 165 supplies a constant current to the resistor 166 to produce a constant voltage of 0.5V across the resistor 166. Accordingly, the output of the amplifier 160 has a voltage of Vcom−0.5V. The amplifier 160 is constructed from P-channel transistors to permit its output voltage to go to substantially 0V.

The amplifier 161, also constructed from P-channel transistors for the same reason, has a voltage Hrmp, equal to half the maximum amplitude of the LLC ramp signal Lrmp, in this example 1.0V for a 2.0V ramp, supplied to its inverting input. An output of the amplifier 161 is coupled via the resistor 168 to the non-inverting input of the amplifier, and this is coupled via the resistor 167, having one same resistance as the resistor 168, to the output of the amplifier 160, The output voltage of the amplifier 161 is therefore 2(Hrmp)−(Vcom−0.5V).

The output of the amplifier 160 is also supplied to the non-inverting input of the comparator 162, whose inverting input is supplied with the LLC ramp signal Lrmp and whose output is connected to a set input S of the flip-flop 164. Conversely, the output of the amplifier 161 is supplied to the inverting input of the comparator 163, whose non-inverting input is supplied with the LLC ramp signal Lrmp and whose output is connected to a reset input R of the flip-flop 164. The output Q of the flip-flop 164 produces a signal Vcp3 which can constitute the PWM signal Vcp. In this case the comparison range of the signal Vcom is effectively 0.5 to 2.5V as is desired, and the PWM signal has the same frequency as the signal Lrmp.

Although particular forms of power supply arrangement and control units are described above by way of example, numerous modifications, variations, and adaptations may be made thereto without departing from the scope of the claims.

The invention claimed is:

1. A method of controlling a PFC (Power Factor Correction) converter, comprising the steps of:
    producing a switching signal dependent upon an output voltage error of the converter;
    producing a current dependent upon an input current of the converter;
    selectively conducting the current via a resistance in dependence upon the switching signal; and
    smoothing a voltage across the resistance to produce a control signal for controlling an off-time duty cycle of the converter.

2. A method as claimed in claim 1 wherein the step of producing the switching signal comprises the steps of producing a first voltage dependent upon the output voltage error of the converter, and comparing said first voltage with a ramp signal to produce the switching signal as a pulse width modulated signal.

3. A method as claimed in claim 2 wherein the step of comparing comprises level-shifting the ramp signal to match an amplitude range of said first voltage.

4. A method as claimed in claim 2 wherein the step of comparing comprises level-shifting said first voltage to match an amplitude range of the ramp signal.

5. A method as claimed in claim 2 wherein the ramp signal has a triangular waveform.

6. A method as claimed in claim 2 wherein the ramp signal has a sawtooth waveform.

7. A method as claimed in claim 6 wherein the step of comparing comprises level-shifting said first voltage to match an amplitude range of the sawtooth waveform, producing a second voltage equal to a maximum amplitude of the ramp signal minus the first voltage, and comparing said first and second voltages with the sawtooth signal to produce the switching signal.

8. A method as claimed in claim 1 wherein the step of producing a current dependent upon an input current of the converter comprises minoring the input current.

9. A method as claimed in claim 8 wherein the step of selectively conducting the current via a resistance in dependence upon the switching signal comprises controlling, with the switching signal, a switch that is coupled to the resistance.

10. A control unit for a PFC (Power factor Correction) converter, comprising:
    a transconductance amplifier responsive to an output voltage of the converter for producing an output voltage error signal;
    a PWM converter for producing a PWM (pulse width modulated) signal dependent upon the output voltage error signal;
    a switching circuit for switching in dependence upon the PWM signal a current representing an input current of the PFC converter;
    a resistance having a first terminal, coupled to an output the switching circuit, and a second terminal; and
    a capacitance having a first terminal coupled to the first terminal of the resistance and a second terminal coupled to the second terminal of the resistance, the resistance and the capacitance being responsive to the switched current to produce a smoothed voltage constituting a control signal for the PFC converter.

11. A control unit as claimed in claim 10 wherein the PWM converter comprises a comparator for comparing a first voltage dependent upon the output voltage error with a ramp signal to produce the PWM signal.

12. A control unit as claimed in claim 11 wherein the PWM converter includes a level-shifter for matching amplitude ranges of the ramp signal and said first voltage.

13. A control unit as claimed in claim 12 and including a connection for supplying a sawtooth waveform as the ramp signal.

14. A control unit as claimed in claim 13 wherein the PWM converter includes a circuit for producing a second voltage, equal to a maximum amplitude of the ramp signal minus the first voltage, for comparison with the ramp signal.

15. A control unit as claimed in claim 10 wherein the switching circuit comprises a current mirror circuit for producing a mirrored current dependent upon an input current of the PFC converter, and a switch controlled by the PWM signal for selectively supplying the mirrored current to the resistance.

16. A control unit as claimed in claim 15 wherein the switching circuit comprises first and second transistors constituting the current mirror circuit, the second transistor conducting said mirrored current, and an input resistance arranged to conduct current of the first transistor via an input terminal of the control unit, the input terminal having a voltage dependent upon the input current of the PFC converter.

17. A control unit as claimed in claim 16 wherein a ratio of said resistance responsive to the switched current to said input resistance is greater than a ratio of a supply voltage of the switching circuit to a maximum magnitude of voltage of said input terminal.

18. In combination, a PFC converter and a control unit as claimed in claim 10 arranged to control a switch of the converter with said control signal.

* * * * *

UNITED STATES PATENT AND TRADEMARK OFFICE
CERTIFICATE OF CORRECTION

| | | |
|---|---|---|
| PATENT NO. | : 7,911,812 B2 | Page 1 of 1 |
| APPLICATION NO. | : 12/016950 | |
| DATED | : March 22, 2011 | |
| INVENTOR(S) | : Colbeck et al. | |

It is certified that error appears in the above-identified patent and that said Letters Patent is hereby corrected as shown below:

In Column 16, line 3, (claim 8, line 3) delete "minoring" and replace with -- mirroring --.

Signed and Sealed this
Thirty-first Day of May, 2011

David J. Kappos
*Director of the United States Patent and Trademark Office*